Patented Oct. 9, 1945

2,386,365

UNITED STATES PATENT OFFICE 2,386,365

MANUFACTURE OF POLYMERIZABLE UNSATURATED ACIDS

Hanns Peter Staudinger, Ewell, Karl Heinrich Walter Tuerck, Banstead, and Eric Harvey Brittain, Epsom Downs, England, assignors to The Distillers Company Limited, Edinburgh, Scotland, a British company No Drawing. Application March 6, 1942, Serial No. 433,631. In Great Britain February 28, 1941

3 Claims. (Cl. 260—530)

This invention is for improvements in or relating to the manufacture of polymerizable unsaturated acids, such as acrylic acid and its alpha-substituted derivatives, e. g., methacrylic or chloracrylic acid, from the corresponding aldehydes by oxidation with molecular oxygen.

The direct oxidation of acrolein with oxygen has hitherto been technically unsatisfactory because of considerable losses due to the formation of polymeric acrylic compounds.

We have found that even if the monomeric acid is formed with good yields during the oxidation, it is almost impossible to isolate it, either as such or in the form of its esters, from the reaction mixture if the usual methods of isolation are employed, even if antipolymerization agents are added.

The invention accordingly provides, in the manufacture of a polymerizable unsaturated aliphatic acid from acrolein and alpha-substitution derivatives thereof by oxidation with molecular oxygen, the steps of adding a diluent to the reaction mixture in such an amount as to reduce the concentration of said acid to such a value that, on heating to distillation temperature, polymerization thereof is substantially prevented and distilling off said acid while maintaining the concentration of the acid remaining in the mixture undergoing distillation at or below said value. In this way, practically all the monomeric acrylic acid which has been formed in the oxidation process is obtained in a state in which it can be used further without danger of sudden uncontrollable polymerization.

In carrying out the process it is preferred to use a diluent which, at the pressure at which distillation is effected, is as volatile as or less volatile than the acid. Where the diluent is more volatile than the acid the conditions of the distillation have to be such as to allow the diluent to entrain the acid without its concentration, in the solution undergoing distillation, being increased beyond a certain value. This is achieved, for example, by using an appropriate amount of the diluent initially or by continuously or periodically adding diluent during the distillation.

Suitable diluents are for example, anisole, phenetole, diamylether, acetic, butyric, chloracetic or isobutyric acids, acetic anhydride, amyl propionate, amyl acetate, ethylidene diacetate, xylene, isopropylbenzene, tetrachloroethane, chlorotoluene, pentachloroethane and ketones. Alcohols, e. g. cyclohexanol, methylcyclohexanol, furfuryl alcohol, tetrahydro-furfuryl alcohol or amyl alcohol, may also be used at temperatures sufficiently low to avoid substantial esterification. We prefer to use those diluents which do not greatly raise the boiling point of the reaction mixture, i. e. such diluents which have a boiling point not higher than about 50° C. above the boiling point of the acid at normal pressure. The acid could also be obtained by subjecting the reaction mixture, without initial fractionation, to steam distillation preferably under reduced pressure while maintaining it diluted with water.

The amount of the diluent required to suppress polymerization of the acid in the solution to be distilled depends on the temperature at which distillation is effected. The higher the distillation temperature, the greater is the amount of diluent which must be present. The maximum permissible concentration of the acid may easily be found out by a preliminary experiment. It is advantageous to use reduced pressure during the distillation and we prefer to carry out the distillation at temperatures not above 100° C. and, when working with large quantities, it is advisable not to exceed 60° C. The distillation of the acid from its diluted solution may be batchwise, e. g. from a still to which a column is attached, or continuously e. g. from a column.

It is especially advantageous to flash distil acrylic acid from the reaction solution and to subject the distillate to a further fractionation either in the vapour or liquid form. The diluent may be added to the reaction mixture while the distillation proceeds, but it is preferable to add it before-hand in order to avoid local polymerization. The presence of unchanged acrolein does not affect the process. The excess of acrolein may be removed before distillation of the acrylic acid is commenced, preferably by leading air or oxygen through the reaction mixture, or it may be distilled off with the acrylic acid, special methods for its condensation being provided, e. g. absorption in a solvent, preferably that which is used for the oxidation, or condensation at the exhaust end of the vacuum pump. The same applies to any lower boiling solvent which has been used for the oxidation step. We have found that such a solvent, e. g. acetic acid, can be distilled off from the reaction mixture at low temperature, e. g. at or below 40° C., and the diluent added immediately thereafter. This has the advantage that the solvent used in the oxidation stage need not come into contact with the diluent.

It is possible to return the diluent to the distillation stage even without removing from it any higher boiling reaction products which it may contain. Only when their concentration becomes considerable are they removed, preferably by distilling off the diluent. These substances include glyceraldehyde and its derivatives, percompounds, and the anhydrides, and it is a special advantage of this process that these substances can be isolated without being decomposed or resinified.

The diluent used according to our process, and the solvent in the oxidation step may be the same; thus, the oxidation can be successfully carried out in the presence of high boiling ethers, such as anisole, acids such as butyric or chloracetic acid or hydrocarbons such as xylene. If water-insoluble solvents are used in the oxidation stage, we prefer to add a small amount of a water-soluble solvent, such as acetic acid or acrylic acid, especially when carrying out the oxidation according to our co-pending United States application Serial No. 411,758.

We have found the oxidation itself proceeds with increased initial speed if the diluent resulting after the distilling off of the acid is re-used in the oxidation reaction without being freed from the other compounds, provided that the solvent does not contain antipolymerizing agents. As a small amount of an organic acid promotes the oxidation reaction, it is even not necessary to carry through the distillation till all the acid has been removed from the solvent.

Acrylic acid, which is obtained after the distillation can, if necessary, be further distilled, either in vacuo or at normal pressure. If traces of per-compounds are present, they may be reduced e. g. by sulphur dioxide or any other reducing agent, but we have found that the further use of the acrylic acid is not affected by any traces of per-compounds which may be present at this stage. Any other method of separating the acrylic acid from the accompanying diluent in the distillate may be used, such as extraction, separation with water or freezing out the diluent, or the acrylic acid.

The acid may be esterified according to known methods, and the ester distilled off from the diluent. It may be reacted with acetylene to yield vinyl and ethylidene esters. If acetic anhydride is used as diluent, the distillate may be heated with or without the addition of further amounts of acetic anhydride, and while continuously or periodically distilling off the acetic acid as it is formed to give acrylic anhydride. The conversion of the acrylic acid in the distillate to anhydride may be effected also in other ways, e. g. by ketene or sulphuryl-chloride.

A special advantage of this process is in its combination with the process of our copending United States application Serial No. 411,758. In that process catalysts such as vanadium pentoxide are used, which are known to act as polymerization catalysts as well. The present invention, however, permits to make use of the excellent yields of that oxidation process without the risk of polymer formation. The present invention has the further advantage that the activity of the oxidation catalyst is not affected and need not be destroyed by chemical action. It is generally not necessary to use anti-polymerizing agents in the process of the present invention, although small amounts of these agents may be used if desired.

*Example 1*

A solution of acrolein in acetic acid is oxidized in the presence of vanadium pentoxide by molecular oxygen till the mixture contains 41.2% by weight of acrylic acid. The unchanged acrolein is removed by means of gaseous oxygen and the reaction mixture is diluted with anisole so that the concentration of acrylic acid in the solution is 19.5% by weight. After filtering off the catalyst the solution is distilled in vacuo. At 30 mm. Hg and 20° to 30° C. the whole of the acetic acid distills over, at 10 mm. Hg and 30° to 33° C. a mixture of 80% by weight of acrylic acid and 20% by weight of anisole can be collected and finally anisole distils over. The yield of monomeric acrylic acid is 95% the remainder being accounted for as distillation loss.

The acetic acid fraction is returned as well as the anisole fraction to the process. The same result is achieved when the acetic acid is flashed off in vacuo from the reaction mixture and the anisole is added only before the acrylic acid is distilled. The acrylic acid may be esterified with ethyl alcohol in the usual way, using sulphuric acid as catalyst to give almost theoretical yields of ethyl acrylate and after this has been distilled off the remaining anisole may be re-used in the distillation process.

*Example 2*

A reaction mixture containing 35 parts by weight of acrylic acid and 65 parts by weight of acetic acid is distilled without reflux at 30° C. while acetic acid is fed continuously to maintain the concentration of the acrylic acid at the same value. The vapours are led into a rectification column from the top of which acetic acid (at 25° C.) and from the bottom of which acrylic acid are continuously removed. The acetic acid is returned to the still, part going to the oxidation process. The acrylic acid is free from polymerization products.

*Example 3*

A mixture of 38 parts by weight of acrolein, 40 parts by weight of anisole, 15 parts by weight of acrylic acid, 0.2 part by weight of vanadium pentoxide, is treated with oxygen at 14° C. till practically all the acrolein is oxidized. After the addition of 55 parts by weight of anisole the reaction mixture is distilled in vacuo at 42° C. without fractionation. The distillate which contains 63 parts by weight of acrylic acid is refractionated after traces of per-compounds have been removed. The over-all yield of acrylic acid is 90%.

*Example 4*

A mixture consisting of 33.5 parts of acrolein and 65 parts of ethylidene diacetate was treated with oxygen at a temperature not in excess of 25° C. After 3½ hours, the rate of reaction had diminished considerably, and the reaction mixture was found to contain acrylic acid equivalent to 73% of the acrolein used initially, together with some unchanged acrolein. The solution was diluted with 50 parts of ethylidene diacetate and distilled; 91% of the acrylic acid was recovered in the distillate. After the acrylic acid had passed over, the excess ethylidene diacetate was distilled off free from acrylic acid. The acrylic acid fraction could be redistilled without polymerization.

What we claim is:

1. In a process for the manufacture of a polymerizable unsaturated aliphatic acid from acrolein and alpha-substituted derivatives thereof by oxidation with molecular oxygen to produce a reaction mixture containing said acid and high-boiling by-products which tend to promote polymerization of said acid, the steps of subjecting the said reaction mixture directly to simple distillation in the presence of a diluent of such volatility as not greatly to alter the boiling point of the reaction mixture and having a boiling point not more than 50° C. higher than said unsaturated acid so that the distillate contains said unsaturated acid together with a considerable proportion of said diluent, and maintaining the concentration of said unsaturated acid in the boiling liquid below about 40% by weight throughout the distillation and, by means of reduced pressure, a distillation temperature below 60° C.

2. In a process for the manufacture of a polymerizable unsaturated aliphatic acid from acrolein and alpha-substituted derivatives thereof by oxidation with molecular oxygen to produce a reaction mixture containing said acid and high-boiling by-products which tend to promote polymerization of said acid, the steps of subjecting the said reaction mixture directly to simple distillation in the presence of anisole so that the distillate contains said unsaturated acid together with a considerable proportion of anisole, and maintaining the concentration of said unsaturated acid in the boiling liquid below about 40% by weight throughout the distillation and, by means of reduced pressure, a distillation temperature below 60° C.

3. In a process for the manufacture of a polymerization unsaturated aliphatic acid from acrolein and alpha-substituted derivatives thereof by oxidation with molecular oxygen to produce a reaction mixture containing said acid and high-boiling by-products which tend to promote polymerization of said acid, the steps of subjecting the said reaction mixture directly to simple distillation in the presence of acetic acid so that the distillate contains said unsaturated acid together with a considerable proportion of acetic acid, and maintaining the concentration of said unsaturated acid in the boiling liquid below about 40% by weight throughout the distillation by adding acetic acid to the reaction mixture, and, by means of reduced pressure, a distillation temperature below 60° C.

HANNS PETER STAUDINGER.
KARL HEINRICH WALTER TUERCK.
ERIC HARVEY BRITTAIN.